United States Patent [15] 3,671,600
Moore [45] June 20, 1972

[54] ETHYLATION OF ADAMANTANE NUCLEUS WITH BF₃ ETHERATE

[72] Inventor: Robert E. Moore, Wilmington, Del.

[73] Assignee: Sun Research and Development Co., Philadelphia, Pa.

[22] Filed: Oct. 27, 1971

[21] Appl. No.: 193,148

[52] U.S. Cl. .................................................. 260/666 M
[51] Int. Cl. ................................. C07c 3/54, C07c 13/28
[58] Field of Search ........................................... 260/666 M

[56] References Cited

UNITED STATES PATENTS 3,382,288  5/1968  Schneider ..................... 260/666 M
3,546,308  12/1970  Moore ............................ 260/666 M
3,560,578  2/1971  Schneider ..................... 260/666 M

*Primary Examiner*—Delbert E. Gantz
*Assistant Examiner*—Veronica O'Keefe
*Attorney*—George L. Church, et al.

[57] ABSTRACT

Adamantane hydrocarbons of the $C_{10}$–$C_{30}$ range having one to four open bridgehead positions are ethylated by the reaction of a mixture of boron fluoride etherate and sulfuric acid (90–100 percent $H_2SO_4$ equivalent by weight) or fluorosulfonic acid ($HFSO_3$) at a temperature in the range of $-10°$ to $100°$ C. During the reaction, the adamantane nucleus remains intact and any alkyl groups attached thereto in the adamantane hydrocarbon charge remain at the original position. Ethylation occurs only at bridgehead positions of the nucleus and from one to four alkyl or cycloalkyl groups can be substituted if such bridgehead positions are open in the starting hydrocarbon. The ethylation product has one or more ethyl substituents than the starting hydrocarbon, which substituents are attached to the adamantane nucleus at bridgehead positions.

6 Claims, No Drawings

ETHYLATION OF ADAMANTANE NUCLEUS WITH BF ETHERATE

BACKGROUND OF THE INVENTION

1. Field of the Invention

This invention relates to the conversion of adamantane hydrocarbons of the $C_{10}$–$C_{30}$ range to ethylated adamantane derivatives.

2. Description of the Prior Art

The cage-like structure of the adamantane nucleus has been illustrated in several ways, of which the following is one example:

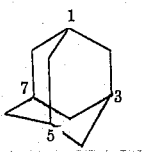

As can be seen, it consists of three condensed cyclohexane rings arranged so that there are four bridgehead carbon atoms (i.e., 1,3,5 and 7) which are equivalent to each other.

The preparation of methyl- and/or ethyl-substituted adamantanes by the isomerization of tricyclic naphthenes by means of an aluminum halide or HF–$BF_3$ catalyst has been described in several references including the following: Schneider U.S. Pat. No. 3,128,316; Janoski et al. U.S. Pat. No. 3,275,700; Schleyer et al., Tetrahedron Letters No. 9, pp. 305–309 (1961); and Schneider et al., JACS, Vol. 86, pp. 5,365–5,367 (1961). The isomerization products can have the methyl and/or ethyl groups attached to the adamantane nucleus at either bridgehead or non-bridgehead positions or both, although completion of the isomerization reaction favors bridgehead substitution. Examples of alkyladamantanes made by such isomerization are methyladamantanes, dimethyladamantanes, ethyladamantanes, methylethyladamantanes, dimethylethyladamantanes and trimethyladamantanes.

The above-mentioned processes are generally complicated procedures resulting in the formation of undesirable by-products involving catalytic reactions requiring careful control of operating conditions and complex recovery procedures since ethyl-substituted adamantanes readily isomerize to dimethyladamantanes.

SUMMARY OF THE INVENTION

The present invention provides a simplified procedure at relatively mild conditions for adding one or more ethyl groups to adamantane or to substituted adamantane hydrocarbons having one or more saturated hydrocarbon group or groups attached to the adamantane nucleus and at least one unsubstituted bridgehead carbon atom. This process involves ethylation of the adamantane hydrocarbon by means of boron fluoride etherate and sulfuric acid (90-100% $H_2SO_4$ equivalent by weight) or fluorosulfonic acid. From one to four ethyl substituents can be added depending upon the number of unsubstituted bridgehead positions available in the starting hydrocarbon and by reacting the adamantane hydrocarbon for a long period of time (4–5 days) in the presence of an excess of $BF_3 \cdot (OEt)_2$. The ethylation product has one or more ethyl substituents than the starting hydrocarbon, which substituents are attached to the adamantane nucleus at bridgehead positions. The present process thus provides a means of preparing a wide variety of ethyl substituted adamantane products having numerous uses, particularly as basic materials in the preparation of polymers, special lubricants, traction fluids, pharmaceuticals and pesticides.

DESCRIPTION OF THE PREFERRED EMBODIMENTS

The ethylation of adamantane or substituted adamantane hydrocarbons having one or more saturated hydrocarbon group or groups attached to the adamantane nucleus and at least one unsubstituted bridgehead carbon atom is effected with ease using boron fluoride etherate.

The process of the invention comprises:

a. establishing an admixture of a saturated adamantane hydrocarbon of the $C_{10}$–$C_{30}$ range having one to four unsubstituted bridgehead carbon atoms, a strong acid such as 90–100% $H_2SO_4$ equivalent by weight sulfuric acid or fluorosulfonic acid and boron fluoride etherate;

b. reacting the mixture at an ethylating temperature in the range of –10° to 100° C. whereby ethylation occurs;

c. and separating from the reaction mixture an ethylated adamantane product having at least one more bridgehead ethyl substituent than the starting adamantane hydrocarbon.

It is characteristic of the present invention that the reaction product has relatively few components as compared to the products from known ethylation processes. For example, the ethylation of the adamantane nucleus with ethylene or ethanol in sulfuric acid produces a myriad of reaction products because numerous rearrangements of the ethylated product can occur. The reaction product is thus a complex mixture of hydrocarbons and the desired ethylated product is obtained in low yield. In contrast when 1,3-dimethyladamantane is ethylated with boron fluoride etherate according to the present invention, a relatively simple mixture of products e.g., 40 percent 1-ethyl-3,5-dimethyladamantane, 10 percent 1,7-diethyl-3,5-dimethyladamantane and 50 percent unreacted 1,3-dimethyladamantane which are easily separated.

The relative simplicity of the reaction products and the cleanliness of reaction in the present process are due to the following circumstances:

1. regardless of the particular adamantane hydrocarbon used as a starting material, the adamantane nucleus remains completely intact under the mild conditions of the process;

2. all alkyl groups attached to the nucleus in the starting material remain at the original position throughout the reaction;

3. ethylation occurs only at unsubstituted bridgehead positions of the adamantane nucleus. These features are unique and characteristic of the ethylation reaction according to the present invention.

A preferred manner of practicing the process comprises first mixing the starting adamantane hydrocarbon with mineral acid to form an emulsion. As previously stated, the strong acid for use in the process can either be sulfuric acid (90–100% $H_2SO_4$ equivalent by weight), preferably sulfuric acid with a strength of 95–99% $H_2SO_4$ or fluorosulfonic acid ($HFSO_3$). Since the fluorosulfonic acid does not have oxidizing potentials as high as sulfuric acid, concentrations of fluorosulfonic acid are not critical. Generally, a volume excess of acid relative to the adamantane hydrocarbons should be used and a volume ratio thereof in the range of 1:1 to 20:1 typically is employed. In instances where the starting hydrocarbon would normally be a solid at the temperature to be used in the ethylation as in the case of such hydrocarbons as adamantane, 1-methyladamantane, 2-methyladamantane, 1-n-decyladamantane, 1-n-eicosyladamantane, 1-cyclohexyladamantane and the like, the hydrocarbon should be dissolved in an inert solvent to prepare the emulsion. For this purpose, any saturated hydrocarbon liquid which does not contain a tertiary hydrocarbon atom can be used. Examples of suitable inert solvents are n-pentane, neopentane, n-hexane, neohexane, n-heptane, cyclopentane, cycloheptane and the like. If 100% $H_2SO_4$ is used, however, neopentane or neohexane are the preferred solvents. The $BF_3$ etherate is added slowly to the cold sulfuric acid with good stirring. The adamantane component and its solvent (if required) are added and the mixture is agitated until the optimum degree of ethylation of the adamantane hydrocarbon has been attained as monitored by Vapor Phase Chromatography.

An excess of boron trifluoride etherate per mole of adamantane hydrocarbon should be used. For example, a range of 2:1 to 20:1 may be used but 10:1 is preferred. The use of higher temperatures within the specified ranges favors polyethylation.

After the reaction is completed, the reaction mixture is settled to separate the hydrocarbon and acid phases. The hydrocarbon phase can be washed with dilute caustic to remove any residual acid dried and then distilled to separately recover products and any unreacted starting hydrocarbon therefrom.

The following example illustrates the invention and is presented without any intention that the invention be limited thereto.

EXAMPLE

An emulsion of 3 cc 1,3-dimethyladamantane in 20 cc of concentrated sulfuric acid (96% $H_2SO_4$) and 10 cc $BF_3 \cdot O(C_2H_5)_2$. was prepared and was stirred at 10° C. The reaction mixture was stirred at room temperature for 3 days. The hydrocarbon layer was separated, washed 3 times with 25 cc of 10% NaOH and water dried and distilled. The final products were equal amounts of 1-ethyl-3,5-dimethyl-adamantane and 1,3-dimethyladamantane.

The alkylated adamantane products that can be made in accordance with the present invention have utility as starting material from which various types of functional derivatives can be prepared, such as monools and diols, and mono- and di-acids, amines, isocyanates or haloadamantanes. Such derivatives can be employed for preparing various kinds of useful products such as special lubricants, traction fluids, solid polymers, pharmaceuticals and pesticides. The properties of each of these kinds of products will vary depending upon the saturated hydrocarbon group or groups that are attached to the adamantane nucleus, and hence the invention provides a means of systematically varying the properties of these products. For example, Duling and Schneider U.S. Pat. No. 3,398,165, issued Aug. 20, 1968, describes special ester-type lubricants having unusually good thermal stability made from alkyladamantane monools and aliphatic diacids or diacid chlorides or from alkyladamantane diols and aliphatic monoacids or monoacid chlorides. Various properties of these lubricants, e.g., their hydrocarbon solubility, can be varied by varying the size and/or number of alkyl substituents on the nuclei in accordance with the present invention. The products prepared by the present invention have utility as components of traction fluid compositions for use in friction or tractive drive systems. Compositions for this purpose have been described in Duling et al. application, Ser. No. 3,256, filed Aug. 19, 1969. Likewise, solid polymers containing adamantane nuclei, such as the polyurethanes described in application Ser. No. 525,290, filed Feb. 7, 1966 and now abandoned, or polyamides as described in application Ser. No. 75,743, filed Sept. 25, 1970 can be made with varying properties by utilizing alkylated adamantanes made by the present invention for preparing the monomers.

In the pharmaceutical area, the desirability of being able to prepare alkyladamantanes for conversion to derivatives having various physiological activities has been indicated by Hoek et al., 85 (1966) Recueil 1045–53. The same is true also with respect to the pesticide or crop protection area. One example of this is illustrated in Schneider U.S. Pat. No. 3,450,775, issued June 17, 1969, wherein an unpredictable activity of 1-hydroxy-3,5-dimethyl-7-ethyladamantane against a plant virus is shown. Specifically, tests showed that this particular alkyladamantanol was effective as an eradicant for Tobacco Mosaic Virus. This compound can be made from 1,3-dimethyladamantane (obtained, for example, as shown in Schneider U.S. Pat. No. 3,128,216) by first alkylating the same by means of ethylene or ethanol or $BF_3 \cdot (OEt)_2$ in accordance with the present invention and then converting the resulting 1,3-dimethyl-5-ethyl-adamantane to the bridgehead monool by means of chromic acid in aqueous acetic acid or by air oxidation in the presence of a metal salt oxidation catalyst.

Pursuant to the requirements of the patent statutes, the principle of this invention has been explained and exemplified in a manner so that it can be readily practiced by those skilled in the art, such exemplification including what is considered to be the best embodiment of the invention. However, it should be clearly understood, that within the scope of the appended claims, the invention may be practiced by those skilled in the art and having the benefit of this disclosure, otherwise than as specifically described and exemplified herein.

The invention claimed is:

1. Process for converting adamantane hydrocarbons to ethylated adamantane derivatives which comprises:
   a. establishing an admixture of a saturated adamantane hydrocarbon of the $C_{10}$–$C_{30}$ range having one to four unsubstituted bridgehead carbon atoms, a strong acid and boron fluoride etherate;
   b. reacting the mixture at an ethylating temperature in the range of −10° to 100° C. whereby ethylation occurs;
   c. and separating from the reaction mixture an ethylated adamantane product having at least one more bridgehead ethyl substituent than the starting adamantane hydrocarbon.

2. Process according to claim 1 wherein said acid is sulfuric acid.

3. Process according to claim 1 wherein the starting adamantane hydrocarbon is selected from the group consisting of adamantane, methyladamantanes, dimethyladamantanes, ethyladamantanes, methylethyladamantanes, dimethylethyladamantanes and trimethyladamantanes.

4. Process according to claim 3 wherein said starting adamantane hydrocarbon is 1,3-dimethyladamantane.

5. Process according to claim 4 wherein said acid is 95–99 percent sulfuric acid.

6. Process according to claim 1 wherein establishing and reacting said mixture is carried out by agitating a mixture of said adamantane hydrocarbon mineral acid and alkylating agent at an alkylating temperature above −10°C.

* * * * *